Sept. 14, 1954    R. D. JABLONSKY ET AL    2,688,796
METHOD OF TREATING SHEET METAL TO REMOVE BUCKLES
Filed Oct. 5, 1950
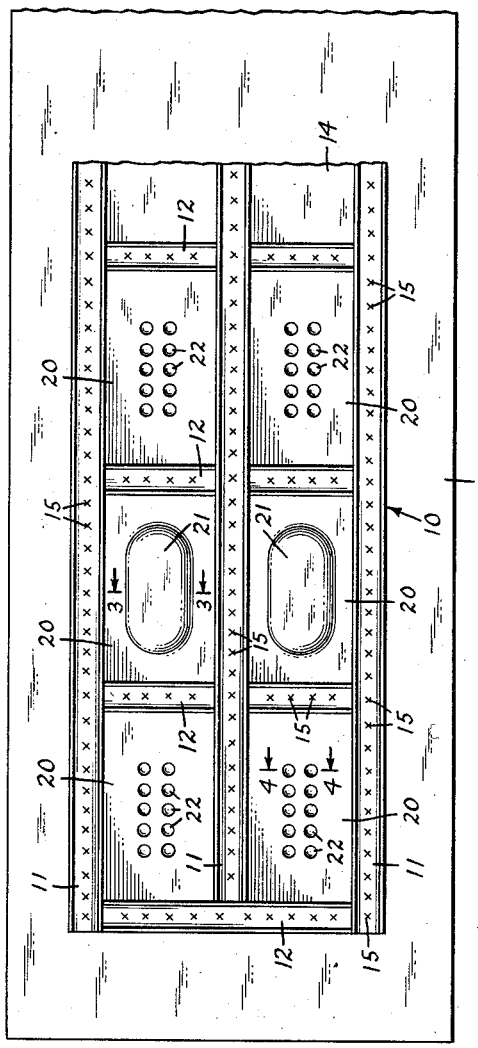
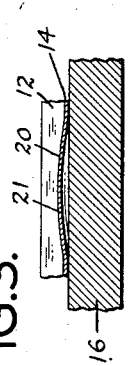
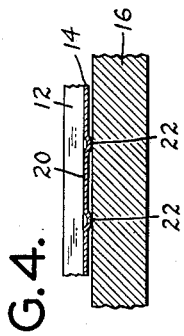
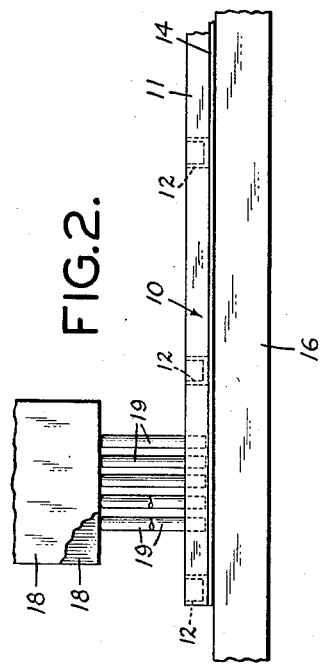
INVENTORS.
ROY D. JABLONSKY
JOSEPH A. HECKMANN
BY
George R. Erieson
ATTORNEY.

Patented Sept. 14, 1954

2,688,796

UNITED STATES PATENT OFFICE 2,688,796

METHOD OF TREATING SHEET METAL TO REMOVE BUCKLES

Roy D. Jablonsky, St. Louis, and Joseph A. Heckmann, St. Charles, Mo., assignors to American Car and Foundry Company, New York, N. Y., a corporation of New Jersey Application October 5, 1950, Serial No. 188,538

4 Claims. (Cl. 29—401)

This invention relates to a method of treating metal structures in which a panel and frame are welded together.

In the welding of thin gauge metal panels to box frames, the unwelded areas of the panels become buckled due to shringage and load strain. Spot welding around the periphery of a panel produces heat that causes metal flow away from the regions adjacent thfereto and during the subsequent cooling of the panel shrinkage around the periphery of the panel creates stress and results in placing the unwelded areas in compression, causing buckling thereof. Buckles are undesirable because of their appearance, resistance to air flow and crystallization resulting from vibration. The problem of eliminating buckles in flat panels has received much attention and many solutions have been tried, such as peening, stretching the panel while welding and bending the frame while welding, without the desired results and with considerable additional manufacturing expense.

An object of this invention is to provide a method of treating welded metal panels to remove or flatten out buckles resulting from the welding operation.

Another object of the invention is to provide a method of removing buckles from unwelded panel areas of a welded structure through the application of flattening pressure and welding heat to the buckles.

A further object of the invention is to remove buckles from the unwelded panel areas of a welded metal structure by utilizing welding equipment to flatten and apply spot welding heat to the buckles.

Another object of the invention is to provide a smooth cover panel for a welded structure by creating stress in the buckled unwelded areas of the panel through spot heating, and removing the upset spot heated regions when cooled.

These and other objects of the invention will be apparent to those skilled in the art from a study of the following description and accompanying drawings, in which:

Fig. 1 is a plan view of a welded metal structure mounted on a welding table with panel buckles partly removed.

Fig. 2 is a side elevation of the welded structure mounted on a welding table and showing a spot welding machine with the electrodes in buckle removing position.

Fig. 3 is a sectional view taken on line 3—3 of Fig. 1 showing the welded structure and a buckled unwelded area of the panel.

Fig. 4 is a sectional view taken on line 4—4 of Fig. 1 showing the welded structure and an unwelded panel area after the buckle removing operation.

The invention is employed with any welded metal structure, having a frame and a cover panel, in which the unwelded areas of the panel become buckled as a result of the welding operation. As shown in the drawings, the boxed frame 10 of the metal structure is composed of a plurality of spaced longitudinally extending members 11 and a plurality of spaced transversely extending members 12, such members being suitably secured together. A thin gauge metal panel 14 covers the frame and is sopt welded, as indicated by numeral 15, to the base portions of the frame members.

In the operation for welding the panel and frame together, the panel is placed flat on a grounded copper table 16 suitably supported to be moved horizontally and the base of the frame is clamped in desired position on top of the panel. While the frame and panel are held together in such relation on the table, the table is shifted to different desired horizontal positions beneath welding heads 18 of a welding machine each carrying a plurality of aligned vertically movable electrodes 19. The welding machine is of a conventional type carrying the electrode heads so that they can be lowered to apply relatively high electrode pressure against the frame during the welding operations.

The process of spot welding causes a shrinkage of the metal of the weld and as a result of this, metal in the immediate area of each weld is in tensile stress. Welding of a panel to a boxed frame causes shrinkage of the metal around the periphery of each weld surrounded region 20 of the panel, insomuch as the panel shrinkage is localized around the peripheries of such regions and the bone of actual metal shrinkage is small relative to the width and height of the panel. The unwelded regions 20 of the panel will be in compressive strain. The difference between the tensile strain around the periphery of each panel region 20 and the compressive strain at the center of such regions creates buckles as indicated by numeral 21.

This buckling of the panel is undesirable for uses where a relatively smooth flat cover surface is required and the present invention relates to a method by which such buckled metal can be treated to provide a flat panel surface. Furthermore, the method is such that the buckles will be removed by application of the welding equipment employed in welding the structure together and without removing the welded metal structure from the welding table.

With the welded structure remaining on the welding table, the buckled unwelded areas of the panel can be discerned by observation or by "oil-canning" through the application of weight, such as by the weight of a person standing thereon. The table is shifted to locate the welding heads above the buckled areas and the heads are controlled to go through the regular spot welding cycle. One or more heads may be employed so that one or more rows of electrodes can be lowered against the panel to press the buckle downwardly while applying the welding pressure and heat. Other apparatus for heating and pressing the buckles down may be employed but, when possible, it is found to be more economical to utilize the welding equipment employed to weld the panel to the frame. The number of electrodes employed is governed by the pattern of the buckles.

The electrode pressure will flatten the buckles against the table causing additional compressive strain in the unwelded portions of the panel and the welding heat will cause metal flow in and adjacent the regions of application. Following this pressure and heat application, cooling of the panel will stress such regions thereby drawing the adjacent panel portions thereto, relieving compression in and flattening out the unwelded panel areas. The flow of metal toward the heated regions will create nubs 22 on the outer panel surface and these may be removed by suitable means, such as a grinding wheel, to provide a flat outer or skin surface.

The invention may be modified in various respects as will occur to those skilled in the art and the exclusive use of all modifications as come within the scope of the appended claims is contemplated.

What is claimed is:

1. The method of treating a metal panel welded on a boxed frame to flatten out a buckle in an unwelded area thereof resulting from the welding operation comprising simultaneously applying welding heat and pressure directly against the panel at spaced points throughout the pattern of the buckle for a time interval equivalent to the welding operation, and thereafter allowing the panel to cool.

2. The method of treating a buckled metal sheet to provide a flat outer surface therefor comprising simultaneously applying localized heat and pressure against spaced points throughout the pattern of the buckle to cause metal flow toward said points, then allowing the metal sheet to cool, and then burnishing the nubs from the outer surface of said metal sheet formed at the points of heat and pressure application.

3. The method of treating a metal structure to flatten out buckles from an unwelded area of a panel after being secured on a boxed frame by spot welding apparatus comprising applying a cycle of welding heat and pressure against the buckle simultaneously by electrodes of the welding apparatus selected to conform to the pattern of the buckle while the panel is lying on the table of the welding apparatus, and then allowing the panel to cool.

4. The method of treating a metal panel welded to a boxed frame to flatten out a buckle from an unwelded area thereof comprising increasing compressive strain in the buckled portion of the panel by directly applying pressure simultaneously at spaced localized points throughout the pattern of the buckles, relieving compression in said buckled portion of the panel by applying welding heat to said localized points simultaneously while under pressure, and creating tensile stress in the areas adjacent said localized points by cooling following said pressure and heat applications.

References Cited in the file of this patent

UNITED STATES PATENTS

| Number | Name | Date |
| --- | --- | --- |
| 690,958 | Hunter | Jan. 14, 1902 |
| 743,911 | Muller | Nov. 10, 1903 |
| 2,001,688 | Paugh | May 14, 1935 |
| 2,120,525 | McKerihan | June 14, 1938 |
| 2,197,150 | Lambert | Apr. 16, 1940 |
| 2,227,476 | Williams | Jan. 7, 1941 |
| 2,304,976 | Watter | Dec. 15, 1942 |